(12) United States Patent
Martínez Morales et al.

(10) Patent No.: US 9,910,242 B2
(45) Date of Patent: Mar. 6, 2018

(54) UNIVERSAL ELECTRONIC EXCHANGER SYSTEM FOR EYEPIECES, ESPECIALLY FOR TELESCOPES

(71) Applicants: Álvaro Martínez Morales, Barcelona (ES); Fernando López Alcalá-Galiano, Barcelona (ES)

(72) Inventors: Álvaro Martínez Morales, Barcelona (ES); Fernando López Alcalá-Galiano, Barcelona (ES)

( * ) Notice: Subject to any disclaimer, the term of this patent is extended or adjusted under 35 U.S.C. 154(b) by 164 days.

(21) Appl. No.: 14/248,995

(22) Filed: Apr. 9, 2014

(65) Prior Publication Data

US 2015/0260949 A1   Sep. 17, 2015

(30) Foreign Application Priority Data

Mar. 17, 2014 (EP) .................................... 14382092

(51) Int. Cl.
*G02B 7/02* (2006.01)
*G02B 7/16* (2006.01)
*G02B 25/00* (2006.01)
*G02B 23/16* (2006.01)
*G02B 23/00* (2006.01)

(52) U.S. Cl.
CPC ............... *G02B 7/16* (2013.01); *G02B 7/023* (2013.01); *G02B 23/00* (2013.01); *G02B 23/16* (2013.01); *G02B 25/001* (2013.01)

(58) Field of Classification Search
CPC .......... G02B 2027/014; G02B 27/0149; G02B 23/00; G02B 23/145; G02B 3/14; G02B 21/00; G02B 21/0016; G02B 21/025; G02B 21/248; G02B 25/001; G02B 7/02; G02B 7/04; G02B 7/06; G02B 7/16; G02B 7/023; G02B 23/16; A61B 19/5223
See application file for complete search history.

(56) References Cited

U.S. PATENT DOCUMENTS

| 5,818,637 | A | 10/1998 | Hoover et al. | |
| 2004/0136063 | A1* | 7/2004 | Yang | G02B 23/16 359/410 |
| 2010/0060980 | A1* | 3/2010 | Suhner | G02B 21/248 359/381 |

FOREIGN PATENT DOCUMENTS

GB          1484544 A        9/1977

* cited by examiner

*Primary Examiner* — Alicia M Harrington
(74) *Attorney, Agent, or Firm* — Winstead PC

(57) ABSTRACT

Universal electronic exchange system for eyepieces, especially for coupling to telescopes or similar, which comprises: an automated rotary device provided with a rotary plate of the revolver type provided with a plurality of eyepiece holders intended to receive different sizes of eyepieces, and actuation means for said rotary plate, an electronic unit for selecting the eyepiece to be used capable of receiving a selection signal generated by a user, determining the aligned position in respect to the optical axis and sending a command signal to an electronic unit for controlling the rotation and stopping of the rotary plate, which in turn is capable of processing the speed, angular path of rotation, and stopping position of the eyepiece to be used, and sending a command signal to the actuation means of said rotary plate for positioning and aligning with precision said eyepiece with the optical axis.

19 Claims, 12 Drawing Sheets

UNIVERSAL ELECTRONIC EXCHANGER SYSTEM FOR EYEPIECES, ESPECIALLY FOR TELESCOPES

The present invention relates to a universal electronic exchange system for eyepieces, especially for telescopes.

BACKGROUND OF THE INVENTION

The problem for amateur astronomers with an economical tripod or mount is changing the eyepieces or lenses of different magnifications. In touching the telescope to extract an eyepiece and insert the next one with a higher or lower magnification, the telescope can sway or move (work is done in the dark) and this can cause the loss of the object being observed or photographed through the telescope.

This problem, which is as common as it is frustrating, is solved by purchasing a heavier, more rigid and precise tripod and mount.

However, the amateur astronomer tends to be reticent about spending money on a new tripod or mount when just starting out with their new hobby, as they would rather invest in other accessory equipment such as cameras, automatic colour filter changers, or other equipment.

The applicant of the present invention, after carrying out a lengthy investigation of more than one year in the market of equipment manufacturers for telescopes on the web pages of specialised stores, the web pages of astronomy equipment manufacturers, and internet forums specialised in astronomy, has reached the conclusion that currently there is no knowledge of an eyepiece exchange device for telescopes that would allow eyepieces to be changed automatically.

Only one eyepiece changing device of a rotary type has been found, similar to the one used in some microscopes, manufactured by a Japanese company. However, this device does not resolve the fact of having to manually activate the change of eyepieces, and moreover does not include a universal support for image equipment, or a focus compensation system after changing the eyepiece.

Furthermore, the researched astronomy internet forums have specific sections under the heading "eyepiece changer", where enthusiasts search for automatic eyepiece exchange equipment with the answer from the more experienced enthusiasts always being that they simply "do not exist".

Additionally, another typical problem for the market segment of advanced users with remote telescopes (expert amateurs, schools and universities) remotely controlled by a computer and located in areas of difficult access such as mountains or away from the cities, is the impossibility of changing the eyepiece when atmospheric conditions require it (the worse the "seeing" or atmospheric conditions, the lower the magnifications the eyepieces require); and as there are no automatic eyepiece exchangers, these telescopes work with their primary focus without an eyepiece or with a fixed eyepiece, making it impossible to decrease or increase the power according to atmospheric conditions, and diminishing their optical performance.

DESCRIPTION OF THE INVENTION

The objective of the universal electronic exchange system for eyepieces, especially for telescopes of the present invention is to resolve the drawbacks presented by the eyepiece exchange devices known in the state of the art, by providing a totally automated eyepiece exchange system, without having to manipulate the telescope.

The universal electronic exchange system for eyepieces, especially for telescopes, object of the present invention, wherein it comprises:
  an automated rotary device which includes a base support provided with an opening alignable with the optical axis of a telescope or similar, a rotary plate of the revolver type coupled on said base support, provided with a plurality of eyepiece holders intended to receive different sizes of eyepieces, and actuation means for said rotary plate,
  an electronic unit for selection of the eyepiece to be used capable of receiving a selection signal generated by a user from a hand control or similar device, processing said selection signal by means of a suitable software to determine the aligned position in respect to the optical axis provided for the eyepiece to be used, and sending a command signal to an electronic unit for controlling the rotation and stopping of the rotary plate,
  wherein said electronic unit for controlling the rotation and stopping of the rotary plate is capable of processing by means of a suitable software the speed, angular path of rotation and stopping position of the eyepiece to be used, and sending a command signal to the actuation means of said rotary plate for positioning and aligning with precision said eyepiece with the optical axis.

In this way, thanks to the system of the invention the exchange of eyepieces is achieved in an automated manner without the need for direct handling of the telescope on the part of the user, guaranteeing at all times an adequate optical performance, irrespective of the atmospheric conditions.

Also, the system of the invention is compatible with the eyepieces of any eyepiece manufacturer in their corresponding diameters (1.25 inches, 2 inches and other diameters), therefore being a universal eyepiece exchanger.

Advantageously, the system further comprises a telescopic adjustment device for equaling the height of the different sizes of eyepieces housed on the rotary plate.

Preferably, said telescopic adjustment device for equaling the height of different eyepiece sizes, includes a set of adapter elements intended to hold in their upper part the respective eyepieces, each adapter element in turn being slidable telescopically over the respective eyepiece holder, or on an intermediate telescopic element which is in turn slidable on the respective eyepiece holder.

Advantageously, each adapter element includes a retaining element, preferably a screw or similar, for fixing and regulating the height of the respective eyepiece.

In the same way, each eyepiece holder includes a retaining element, preferably a screw or similar, for fixing and regulating the height of the respective adapter element or the respective intermediate telescopic element.

Advantageously, the rotary plate includes a plurality of cavities provided with joining means, preferably by threading, for coupling of the respective eyepieces holders.

Preferably, the actuation means of the rotary plate comprise an electric motor connected to the rotary plate through means of transmission of the rotary movement and friction means for controlling the speed and stopping of said rotary plate.

Advantageously, the system further comprises an upper mounting plate arranged above the set of eyepieces of the rotary plate, which can be adjusted in height by means of a telescopic adjustment device.

In a preferred embodiment, the telescopic adjustment device of the height of the upper mounting plate comprises at least one telescopic rod, preferably three rods, coupled between said upper mounting plate and the base support of the rotary plate, and can be regulated in height by means of a locking element, preferably a screw or similar.

Advantageously, the upper mounting plate comprises a cavity provided for coupling a shutter device for the eyepiece to be used.

Preferably, the shutter device of the eyepiece to be used comprises a movable shutter element coupled in a displaceable manner within the cavity of the upper mounting plate and mounted concentrically with the optical axis of the telescope or similar, and actuation means capable of coupling said movable shutter element with the eyepiece in use to prevent any light from entering, and capable of uncoupling said movable shutter element in respect to said eyepiece before starting the movement of the rotary plate for the next exchange of eyepieces.

According to a first embodiment, the actuation means of the movable shutter element comprise a set of solenoids coupled to the upper mounting plate and mounted with their respective axes substantially parallel to the optical axis, and connection elements, preferably pins, for transmission of the movement from the axes of the solenoids to the movable shutter element, in such a way that when the solenoids are electrically activated said movable shutter element is moved towards the eyepiece in use until they couple together, and comprising additionally return means, preferably springs, provided for automatically uncoupling the movable shutter element when the solenoids are deactivated or in the case of a fault in the power supply.

According to a second embodiment, the actuation means of the movable shutter element comprise a set of solenoids coupled to the upper mounting plate and mounted with their respective axes substantially perpendicular to the optical axis, and connection elements, preferably pairs of wedge-shaped cams slidable between each other, for transmission of the movement from the axes of the solenoids to the movable shutter element, in such a way that when the solenoids are electrically activated said movable shutter element is moved towards the eyepiece in use until they couple together, and comprising additionally return means, preferably springs, provided for automatically uncoupling the movable shutter element when the solenoids are deactivated or in the case of a fault in the power supply.

Optionally, the upper mounting plate further comprises means for connection to a universal coupling device for image capture apparatus, such as photographic cameras, video cameras or similar.

Advantageously, the system further comprises automatic means for correcting the focus of each eyepiece allowing at all times an optimum focus to be provided and to send an actuation order to a motor for controlling the primary focus of the telescope or similar.

BRIEF DESCRIPTION OF THE DRAWINGS

With a view to facilitating the description of that set out above a set of drawings is attached where schematically and merely by way of a non-limiting example, a practical case of embodiment is represented of the universal electronic exchange system for eyepieces, especially for telescopes, of the invention, wherein.

DESCRIPTION OF A PREFERRED EMBODIMENT

Figure 1:
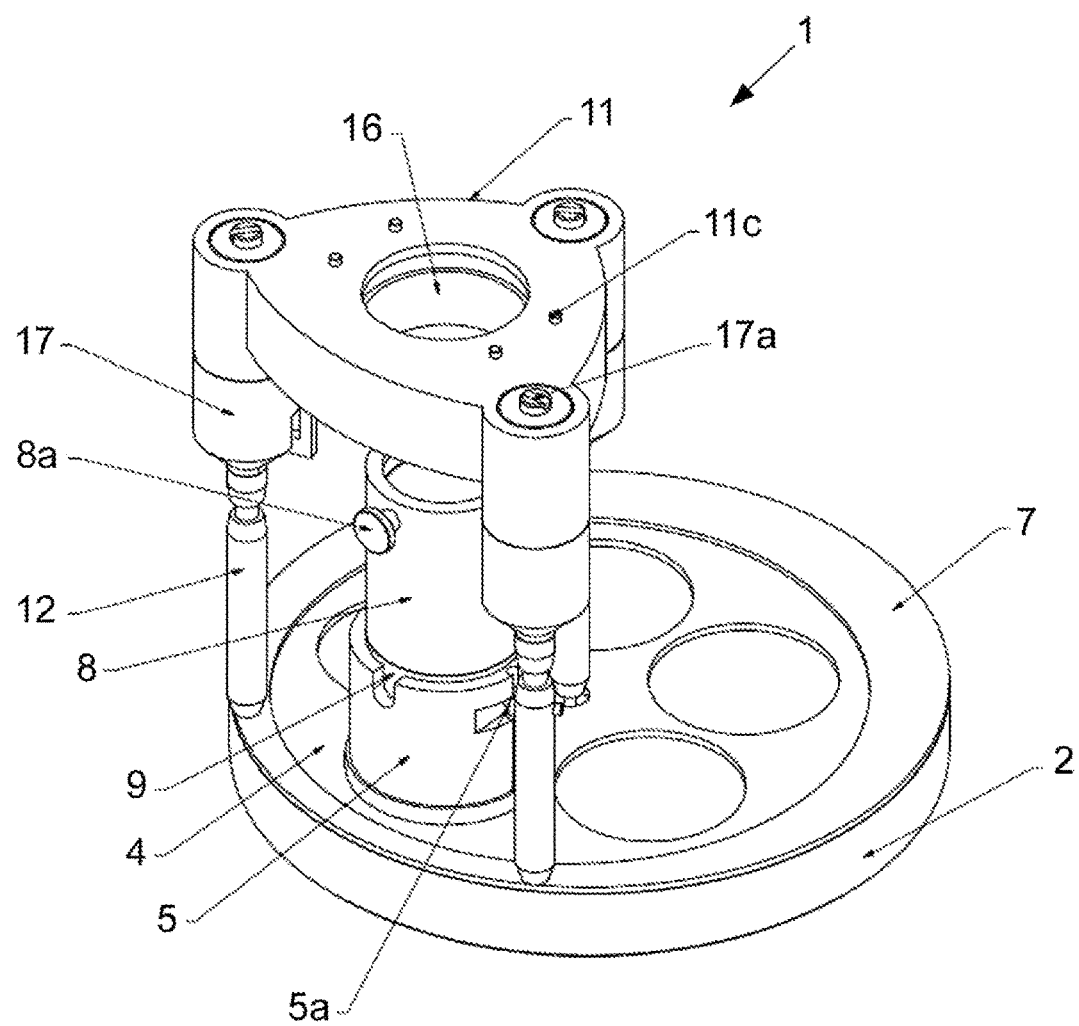
FIG. 1 is an upper perspective view of the exchange system for eyepieces, according to a first embodiment of the actuation means of the shutter device.
Figure 2:
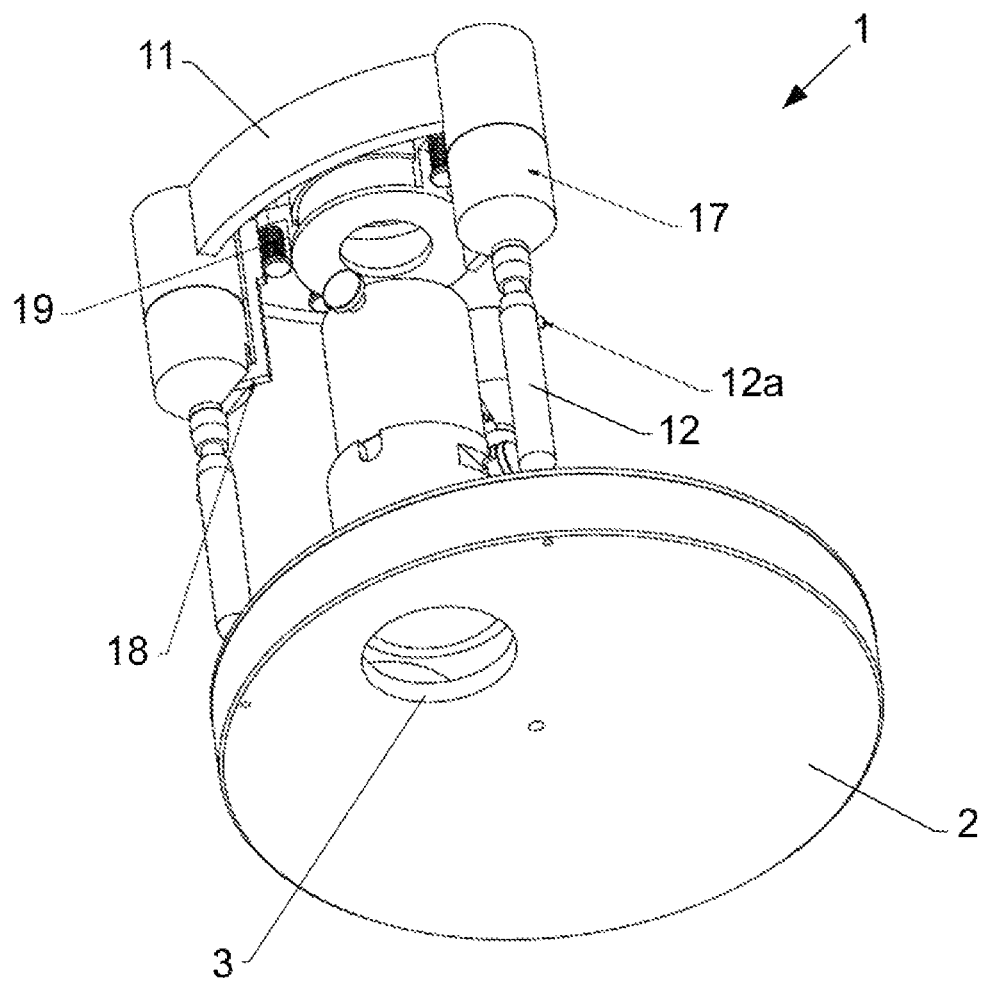
FIG. 2 is a lower perspective view of the exchanger system for eyepieces shown in FIG. 1.

In reference to FIGS. 1 and 2, the universal electronic exchange system 1 for eyepieces, especially for telescopes, object of the present invention, comprises an automated rotary device which includes a base support 2 provided with an opening 3 alignable with the optical axis of a telescope or similar, a rotary plate 4 of the revolver type coupled on said base support 2, provided with a plurality of eyepiece holders 5 intended to receive different sizes of eyepieces, and actuation means (not shown) for said rotary plate 4.

The actuation means of the rotary plate 4 comprise an electric motor connected to the rotary plate 4 through means of transmission of the rotary movement and friction means for controlling the speed and stopping of said rotary plate 4. According to a preferred embodiment, said transmission means can include a toothed wheel mounted on the shaft of the motor that transmits the movement of rotation to the rotary plate 4 of the eyepieces by means of a reduction gear and a pressure system between the drive wheel and the rotary plate 4.

Figure 3:
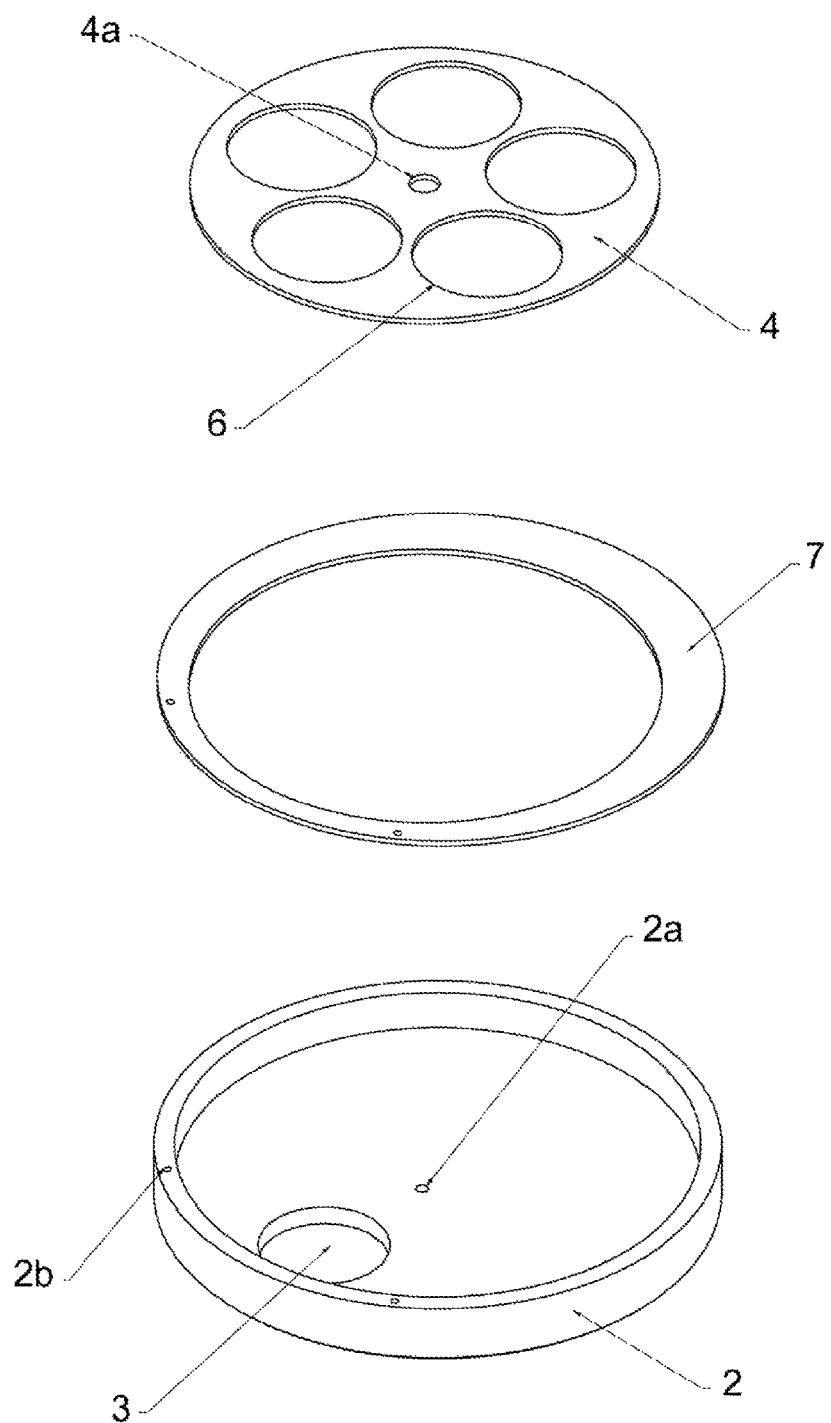
FIG. 3 is an exploded perspective view of the base support of the rotary device, showing an adjustment cap and the rotary plate provided with cavities for coupling the eyepieces.

As can be appreciated from FIG. 3, the rotary plate 4 includes a plurality of cavities 6 for coupling of the respective eyepiece holders 5, and can have a capacity for three, four or five eyepiece holders 5 or any other appropriate combination by means of a standard thread coupling.

Likewise, the rotary plate 4 is mounted with the capacity to rotate on an annular adjustment cap 7, which is coupled in turn on the base support 2. Also, both the base support 2 and the rotary plate 4 include respective orifices 2a and 4a respectively provided for housing the axis of rotation of the rotary plate 4.

The exchange system 1 for eyepieces of the invention further includes an electronic unit for selection of the eyepiece to be used capable of receiving a selection signal generated by a user from a hand control, via cable, wireless or the support PC or any other analogous system, processing said selection signal by means of appropriate software to determine the aligned position in respect to the optical axis provided for the eyepiece to be used, and sending a command signal to an electronic unit for controlling the rotation and stopping of the rotary plate.

Said electronic unit for controlling the rotation and stopping of the rotary plate is capable of processing by means of a suitable software the speed, angular path of rotation and stopping position of the eyepiece to be used, and sending a command signal to the actuation means of said rotary plate for positioning and aligning with precision said eyepiece with the optical axis.

The power supply to the system 1 is provided by means of a 12 V dc charger from the general power supply of 110 V ac-250 V ac.

Figure 4:
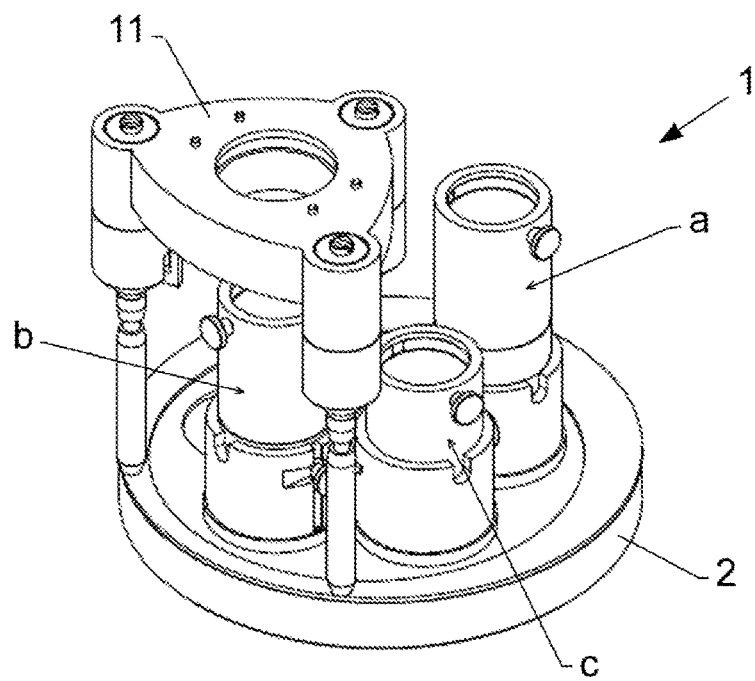
FIGS. 4 and 5 show a perspective and an elevation view respectively of the exchange system for eyepieces showing three eyepieces of different sizes in length mounted on the rotary plate, and regulated in height by means of the respective telescopic adjustment device.
Figure 5:
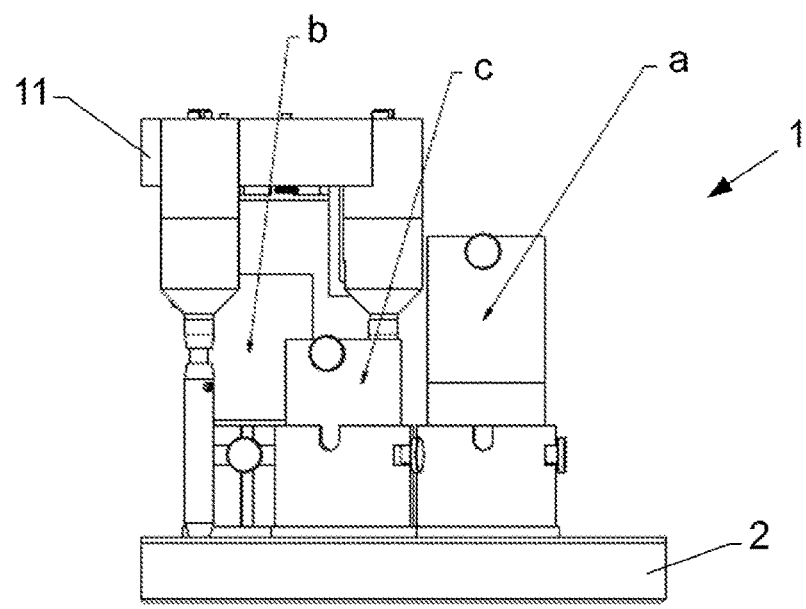
Figure 6:
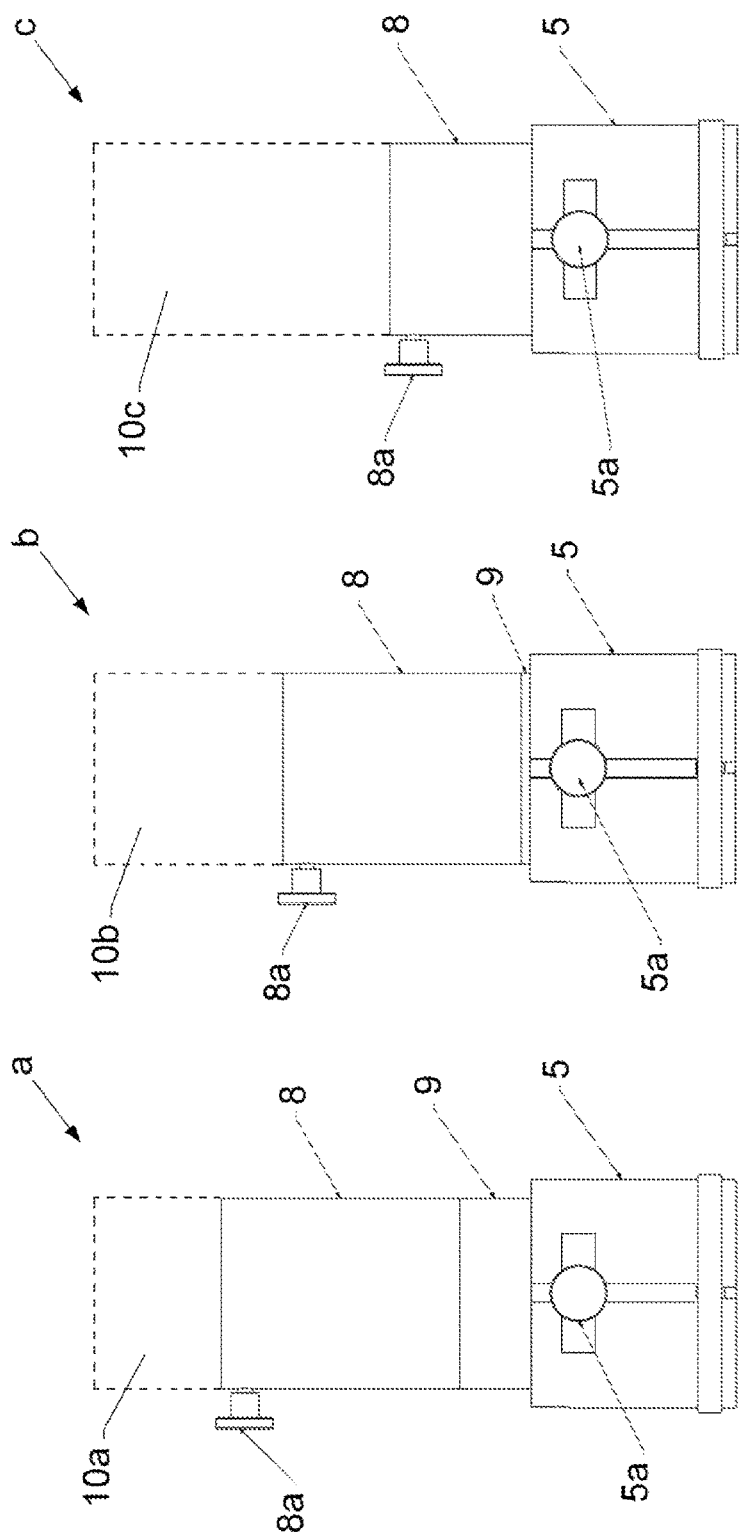
FIGS. 6a to 6c are elevation views of three eyepieces of different sizes in length respectively, mounted on the respective eyepiece holder and regulated in height by means of said telescopic adjustment device.

In reference to FIGS. 4 to 6, the exchange system 1 further comprises a telescopic adjustment device for equaling the height of the different sizes of eyepieces housed on the rotary plate 4.

FIGS. 4 and 5 illustrate an example with three positions a-c corresponding to three types of eyepieces 10a-10c of different sizes in length (illustrated schematically with a dashed line in FIGS. 6a-6c) mounted on the rotary plate 4 and regulated in height by means of said telescopic adjustment device, in such a way that the total height of the three eyepieces 10a-10c can be equalled, as described below.

The telescopic adjustment device is made up of a set of tubular adapter elements 8 intended to hold in their upper part the standard male connection of the respective eyepieces 10a-10c, each adapter element 8 in turn being telescopically slidable over the respective eyepiece holder 5 or over an intermediate tubular telescopic element 9 which is in turn slidable over the respective eyepiece holder 5.

Further, each adapter element 8 includes a retaining screw 8a in a lateral position and accessible to the user, for fixing and regulating the height of the respective eyepiece 10a-10c. Similarly, each eyepiece holder 5 includes a retaining screw 5a for fixing and regulating the height of the respective adapter element 8 or the respective intermediate telescopic element 9.

FIG. 6a shows a high position "a" for a small-sized eyepiece 10a mounted in the eyepiece holder 5 using an adapter element 8 and an intermediate telescopic element 9, said intermediate telescopic element 9 being regulated to an appropriate height by means of a retaining screw 5a of the eyepiece holder 5.

FIG. 6b shows an intermediate position "b" for a medium-sized eyepiece 10b mounted in the eyepiece holder 5 using an adapter element 8 and an intermediate telescopic element 9, said intermediate telescopic element 9 being regulated to a lower height than in the previous case of FIG. 6a.

FIG. 6c shows a low position "c" for a large-sized eyepiece 10c mounted in the eyepiece holder 5 using an adapter element 8 regulated to a lower height than in the previous cases of FIGS. 6a and 6b. It must be noted that in this case the use of an intermediate telescopic element 9 is not necessary.

Figure 12:
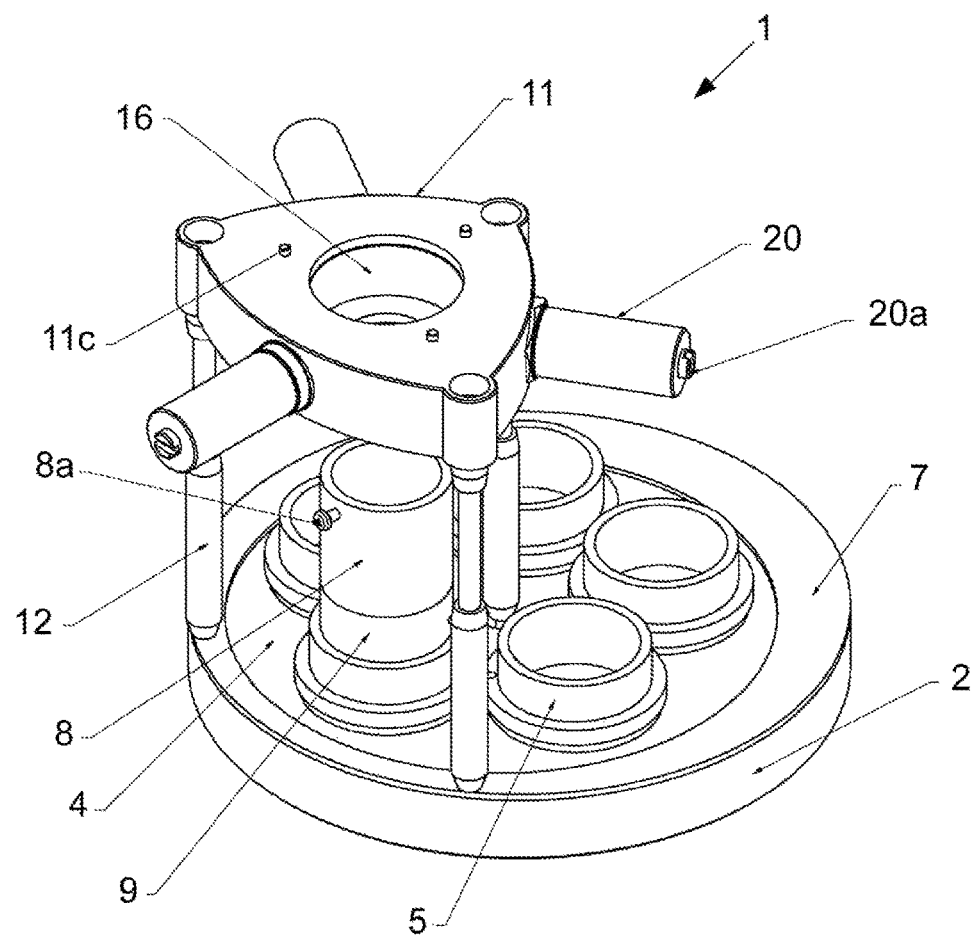
FIG. 12 is an upper perspective view of the exchange system for eyepieces, according to a second embodiment of the actuation means of the shutter device.
Figure 13:
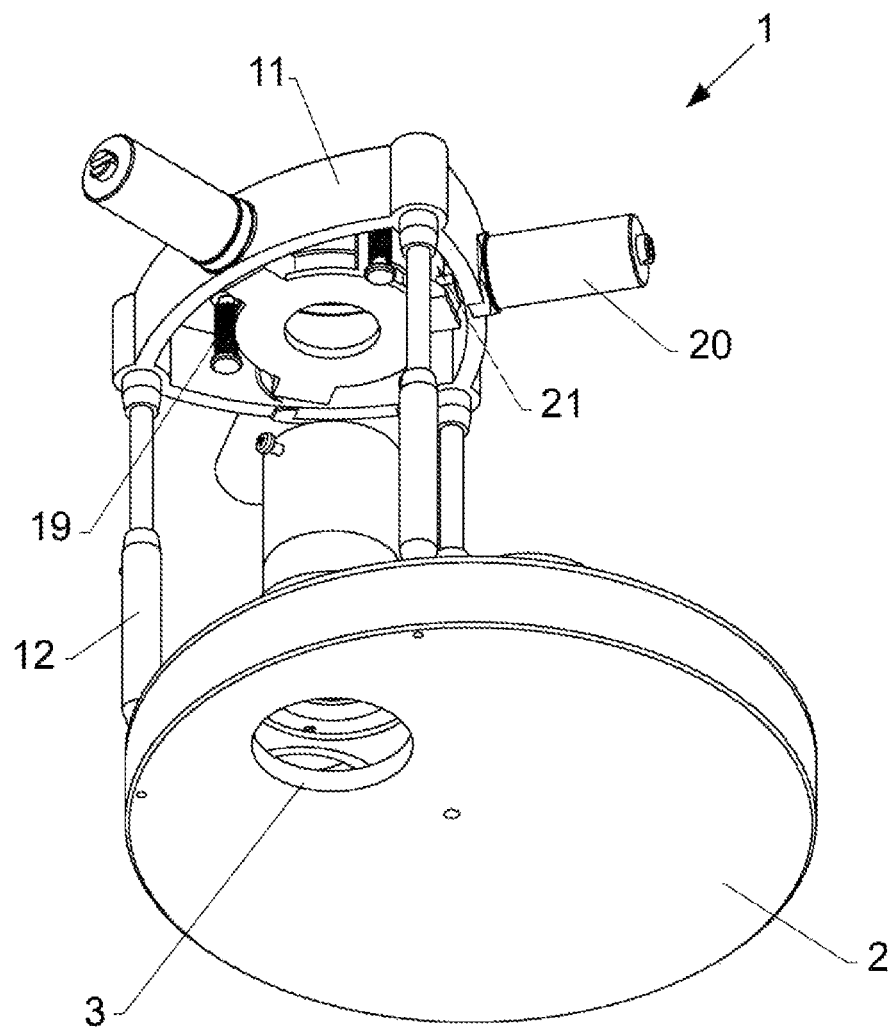
FIG. 13 is a lower perspective view of the exchanger system for eyepieces shown in FIG. 12.

As may be appreciated for example in FIG. 1 or 12, the exchange system 1 for eyepieces of the invention further comprises an upper mounting plate 11 arranged above the set of eyepieces of the rotary plate 4 which can be regulated in height by means of a telescopic adjustment device made up of a set of three or more telescopic rods 12 coupled between said upper mounting plate 11 and the base support 2 of the rotary plate 4, and can be regulated in height by means of a locking screw 12a in a lateral position and accessible to the user.

Figure 7:
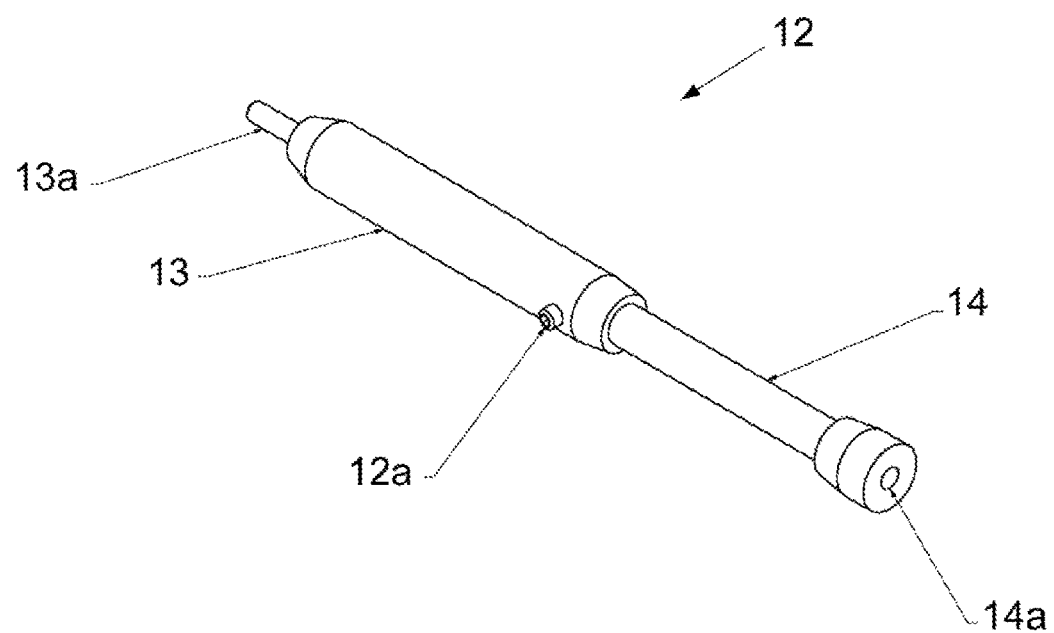
FIG. 7 is a perspective view of a telescopic rod belonging to the device for telescopic adjustment of the height of the upper mounting plate.
Figure 14:
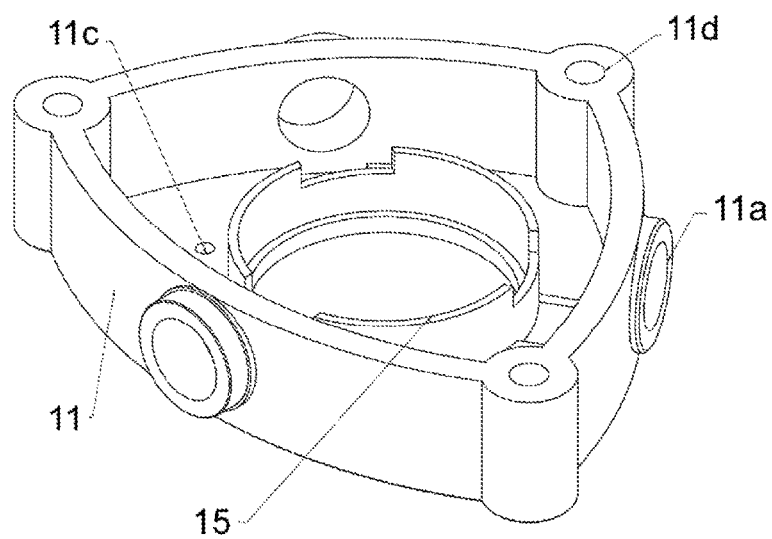
FIG. 14 is a lower perspective view of the upper mounting plate according to a second embodiment of the actuation means of the shutter device.

More specifically, as can be appreciated from FIG. 7, each telescopic rod 12 comprises a body 13 coupled by its end 13a in a housing 2b of the base support 2 (see FIG. 3), and a shaft 14 mounted sliding within said body 13 fixed by one end 14a in a housing 11d of the upper mounting plate 11 (see FIG. 14).

Figure 8:
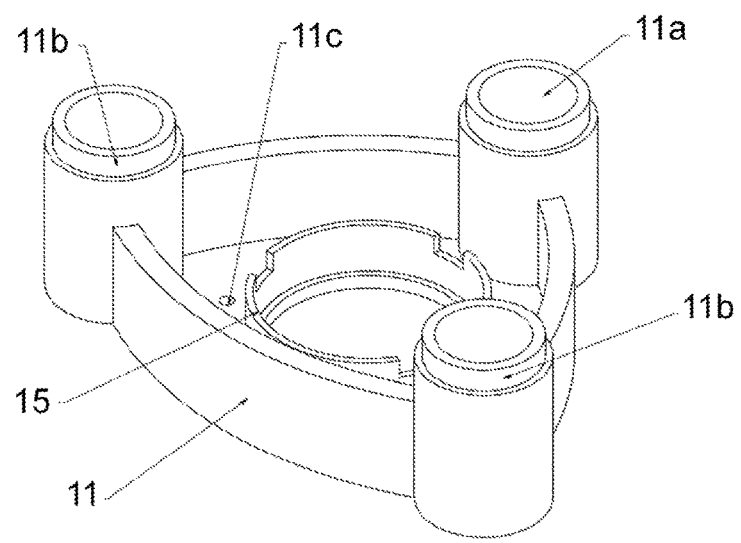
FIG. 8 is a lower perspective view of the upper mounting plate according to a first embodiment of the actuation means of the shutter device.
Figure 9:
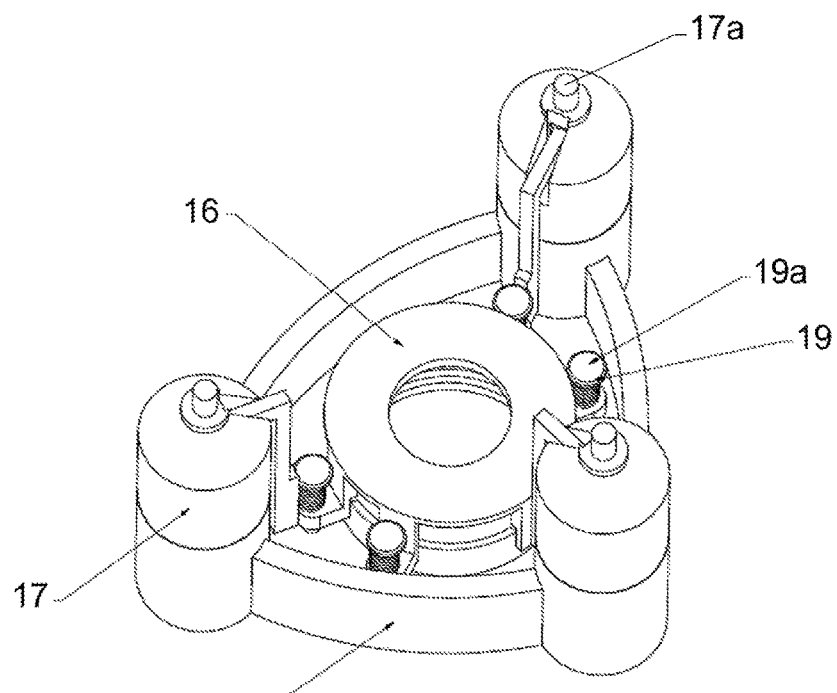
FIG. 9 is a lower perspective view of the upper mounting plate showing also the movable shutter element and its respective actuation means according to the first embodiment.

As can be appreciated for example in FIGS. 8 and 9, the upper mounting plate 11 comprises a cavity 15 provided for the coupling of a shutter device of the eyepiece to be used, which is made up of a movable shutter element 16 coupled in a displaceable manner within said cavity 15 of the upper mounting plate 11 and mounted concentrically with the optical axis of the telescope or similar.

In the position at rest said movable shutter element 16 is uncoupled from the eyepiece in use and therefore allows the free rotation of the rotary plate 4 to carry out the change of eyepieces. When the exchange system 1 of eyepieces is powered the movable shutter element 16 displaces until making physical contact with the eyepiece in use, in such a way as to prevent ambient light from affecting the system. Likewise, it includes braking means which guarantee that, in any position of the system 1, there is no misalignment of the optical axis due to different positions of the masses of the eyepieces and of the rotary device in general.

The displacement of the movable shutter element 16 is carried out through the action of actuation means capable of coupling the shutter element 16 with the eyepiece in use, thus preventing any light from entering, and capable of uncoupling the movable shutter element 16 in respect to said eyepiece before starting the movement of the rotary plate 4 for the next exchange of eyepieces.

According to a first embodiment shown in FIGS. 1, 2 and 8 to 11, the actuation means of the movable shutter element 16 comprise a set of solenoids 17 coupled to the upper mounting plate 11 in respective housings 11a and mounted with their respective axes 17a substantially parallel to the optical axis. It also comprises connection means, preferably pins 18, for transmission of the movement from the axes 17a of the solenoids 17 to the movable shutter element 16 in such a way that when the solenoids 17 are electrically activated said movable shutter element 16 is displaced towards the eyepiece in use until they couple together.

Figure 10:
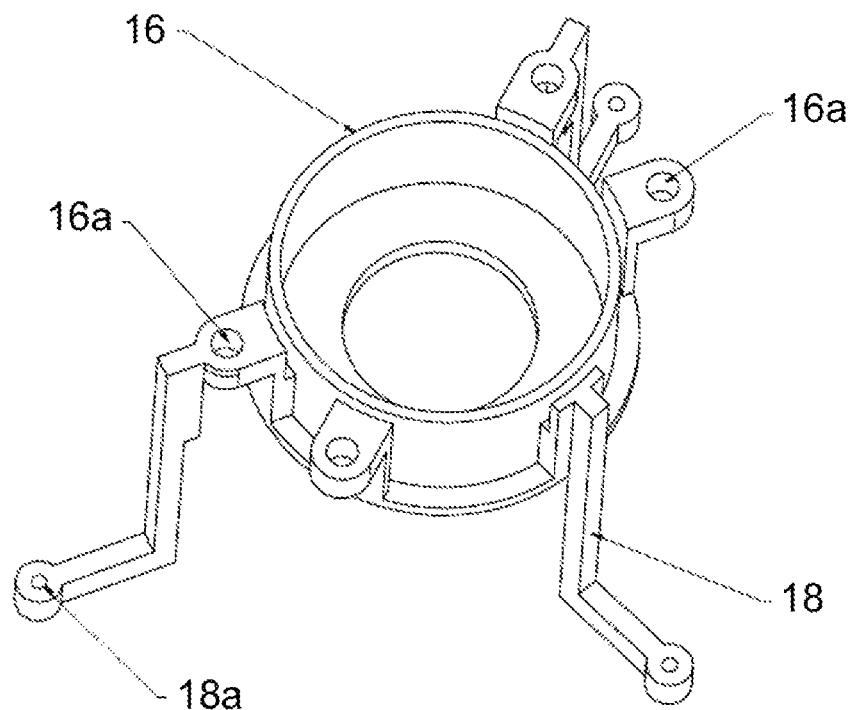
FIG. 10 is an upper perspective view of the movable shutter element according to the first embodiment.
Figure 11:
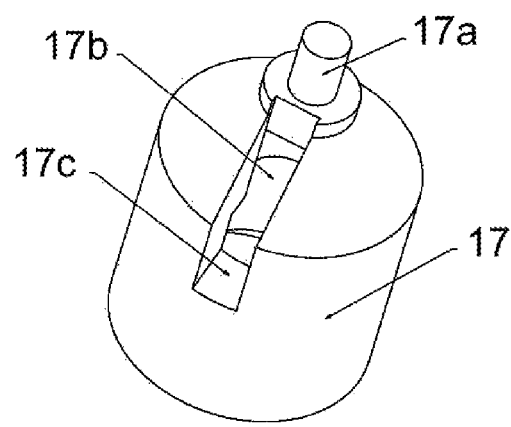
FIG. 11 is a perspective view of the configuration of a solenoid according to the first embodiment.

In reference to FIG. 11, each solenoid 17 includes a thread 17b coupled to a complementary thread 11b of the housing 11a of the upper mounting plate 11 (see FIG. 8) and a groove 17c made in said body of the solenoid 17 provided for passage of the end of the respective pin 18, each pin 18 being provided in turn at their end with an orifice 18a for coupling with the axis of the solenoid 17 (see FIGS. 9 and 10).

Also, said actuation means comprise return means, preferably springs 19, provided for automatically uncoupling the movable shutter element 16 when the solenoids 17 are deactivated or in the case of a fault in the power supply. Each return spring 19 is mounted around a bolt joined at one end to the upper mounting plate 11 in respective housings 11c, the travel of said return spring 19 being delimited between a support surface of the movable shutter element 16 and a stopper 19a disposed on the free end of said bolt. Said support surface includes a guide orifice 16a through which the respective bolt slides, allowing the linear displacement of the movable shutter element 16.

When the solenoids 17 are activated, the movable shutter element 16 displaces until reaching the eyepiece in use at the same time as the return springs 19 are compressed. In contrast, when the solenoids 17 are deactivated whether because the system of selection, rotation and positioning of an eyepiece is in progress or because there is a fault in the power supply to the system, said return springs 19 act by uncoupling the movable shutter element 16 which allows a free and even manual actuation of the system to carry out the selection and positioning of the eyepieces.

According to a second embodiment shown in FIGS. 12 to 17, the actuation means of the movable shutter element 16 comprise a set of solenoids 20 coupled to the upper mounting plate 11 in respective housings 11a and mounted with their respective axes 20a substantially perpendicular to the optical axis, and connection elements, preferably pairs of cams 21, 22 wedge-shaped and slidable between each other, for the transmission of movement from the axes 20a of the solenoids 20 to the movable shutter element 16 in such a way that when the solenoids 20 are electrically activated said movable shutter element 16 is displaced towards the eyepiece in use until they couple together.

Figure 15:
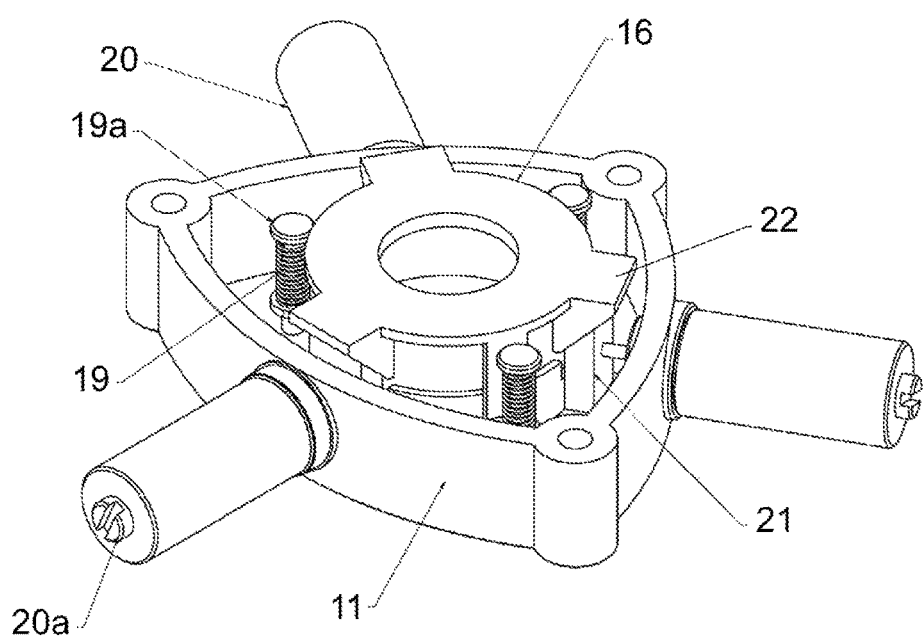
FIG. 15 is a lower perspective view of the upper mounting plate showing also the movable shutter element and its respective actuation means according to the second embodiment.
Figure 16:
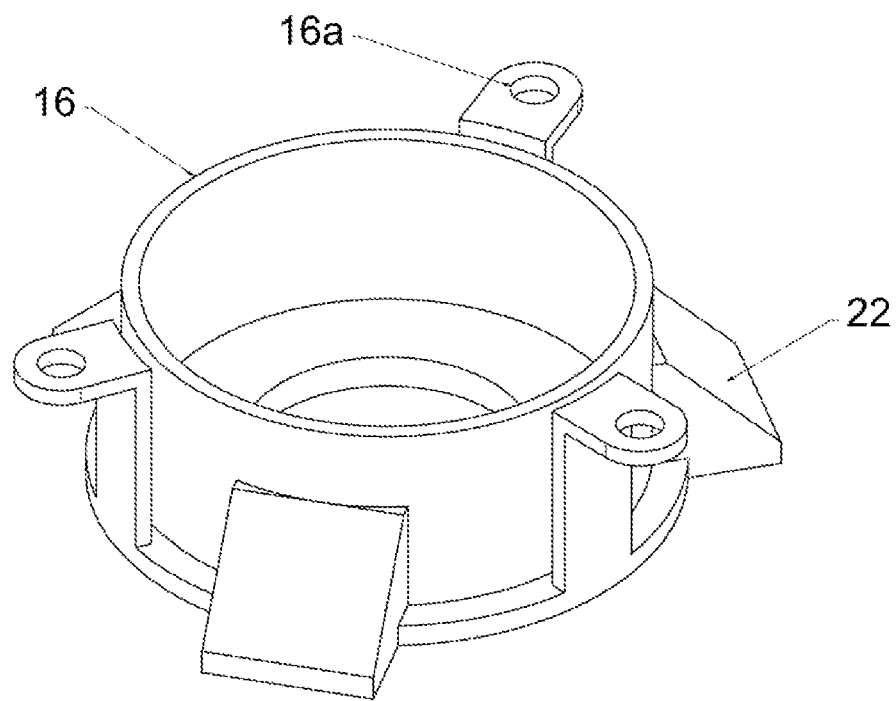
FIG. 16 is an upper perspective view of the movable shutter element showing its respective wedge-shaped cams, according to the second embodiment.
Figure 17:
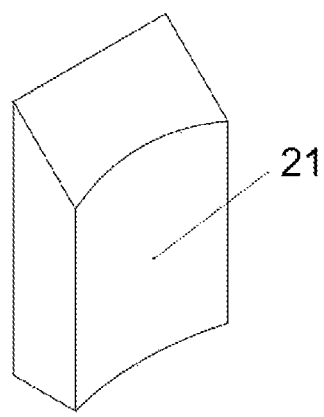
FIG. 17 is a perspective view of one of the complementary cams associated to the corresponding solenoid axes, according to the second embodiment.

In reference to FIGS. 15 to 17, each pair of cams includes a driving cam 21 facing the axis 20a of the solenoid 20 (see FIG. 15) and a driven cam 22 joined to the movable shutter element 16 capable of being displaced thanks to the mutual wedge sliding, thus allowing the linear displacement of said moveable shutter element 16.

In the same way, said actuation means comprise return means, preferably springs 19, provided for automatically uncoupling the movable shutter element 16 when the solenoids 20 are deactivated or in the case of a fault in the power supply.

The upper mounting plate 11 further comprises connection means (not shown) to a universal coupling device for image capture apparatus, such as photographic cameras, video cameras or similar, including other devices used in astronomy for complementary mounting to the image devices such as filters, filter exchange carousels, off-axis guide systems, adaptive optics, etc. Generally, said connection means consist of a plate with a standard threaded device for photographic cameras, video cameras and other image systems, which is integrated into the upper mounting plate 11.

The exchange system 1 for eyepieces of the invention further comprises automatic means for correcting the focus of each eyepiece.

According to one embodiment, the automatic focus correction means include an electronic focus compensation unit (not shown) capable of capturing individualised data on the focus of each eyepiece, processing said information by means of a suitable software which allows the optimum focus to be calibrated at all times for each eyepiece, and sending an actuation order to a primary focus control motor of the telescope or similar in order to carry out said calibration. Said unit has a memory for each eyepiece in particular.

It is important to note that calibration of the optimum focus of the system is required for each one of the eyepieces mounted on the eyepiece exchange system 1. These individualised data on the optimum focus of the system are memorised permanently by the system and are sent to the control motor of the primary focus system in correlation with the eyepiece in particular selected once the process of selecting and changing said eyepiece in particular has been completed.

Alternatively, the automatic focus correction means can incorporate an autofocus system replacing the system of focusing through calibration and memorised focus data which are sent to the telescope focus motor when the process of changing eyepieces has been completed. The autofocus system is mounted on the exchange system 1 by means of a light beam splitter prism of the optical axis of the eyepiece, a video camera which captures one of the two images produced by the prism and a suitable software which sends an actuation order to a control motor of the primary focus of the telescope or similar once the process of selecting and changing said eyepiece in particular has been completed.

Despite the fact that reference has been made to a specific embodiment of the invention, it is obvious for a person skilled in the art that the described universal electronic exchange system for eyepieces, especially for telescopes is susceptible to several variations and modifications, and that all the aforementioned details can be substituted for others which are technically equivalent, without deviating from the scope of protection defined by the attached claims.

The invention claimed is:

1. A universal electronic exchange system for eyepieces, made to couple and operate with a telescope made to view distant objects, the universal electronic exchange system comprising:
    an upper mounting plate;
    a shutter element coupled to the upper mounting plate;
    an automated rotary device comprising:
        a base support provided with an opening alignable with an optical axis of a telescope;
        a revolver-type rotary plate coupled on the base support;
    a first tubular member comprising:
        a first eyepiece; and
        a first eyepiece holder connected at least indirectly to the first eyepiece;
    a second tubular member comprising:
        a second eyepiece; and
        a second eyepiece holder connected at least indirectly to the second eyepiece;
    wherein the first and second tubular members are parallel to the optical axis and adaptable to achieve appropriate height to make physical contact with the shutter element so as to prevent entrance of ambient light into an interface formed thereby;
    an electric motor connected to the revolver-type rotary plate for transmission of a rotary movement to the revolver-type rotary plate; and
    an electronic unit for tubular-member selection, wherein the electronic unit is made and arranged to:
        receive a selection signal indicative of a tubular member to be used, wherein the tubular member to be used is selected from the first and second tubular members, wherein the selection signal is used for controlling rotation and stopping of the revolver-type rotary plate;

process a speed, angular path of rotation and stopping position of the tubular member to be used; and send a command signal to the electric motor of the revolver-type rotary plate for positioning and aligning the tubular member to be used with the optical axis.

2. The system according to claim 1, wherein at least one of the first and second tubular members comprises a telescopic adjustment device for equaling a height of different sizes of eyepieces.

3. The system according to claim 2, wherein said telescopic adjustment device for equaling the height of different sizes of eyepieces, includes a set of adapter elements intended to hold in their upper part the respective eyepieces, each adapter element in turn being slidable telescopically over the respective eyepiece holder, or on an intermediate telescopic element which is in turn slidable on the respective eyepiece holder.

4. The system according to claim 3, wherein each adapter element includes a retaining element for fixing and regulating the height of the respective eyepiece.

5. The system according to claim 3, wherein each eyepiece holder comprises a retaining element for fixing and regulating the height of the respective adapter element or the respective intermediate telescopic element.

6. The system according to claim 1, wherein the revolver-type rotary plate comprises a plurality of cavities provided with a threading, for coupling of the respective eyepiece holders.

7. The system according to claim 1, wherein said electric motor is connected to the revolver-type rotary plate through a transmission mechanism including a toothed wheel for the transmission of the rotary movement and through a friction mechanism including a pressure system for controlling the speed and stopping of the revolver-type rotary plate.

8. The system according to claim 1, wherein said upper mounting plate is arranged above the first and second eyepieces and can be regulated in height by means of a telescopic adjustment device.

9. The system according to claim 8, wherein the telescopic adjustment device of the height of the upper mounting plate comprises at least one telescopic rod coupled between said upper mounting plate and the base support of the revolver-type rotary plate, and can be regulated in height by means of a locking element.

10. The system according to claim 8, wherein the upper mounting plate comprises a cavity provided for coupling a shutter device for the tubular member to be used, wherein the shutter device comprises the shutter element.

11. The system according to claim 10, wherein:
the shutter element is movable, coupled in a displaceable manner within the cavity of the upper mounting plate and mounted concentrically with the optical axis of the telescope; and
the shutter device comprises an actuation mechanism made to couple said movable shutter element with the tubular member to be used to prevent any light from entering, and made to uncouple said movable shutter element in respect to the tubular member to be used before starting movement of the revolver-type rotary plate for a next exchange of tubular members.

12. The system according to claim 11, wherein the actuation mechanism of the movable shutter element comprise a set of solenoids coupled to the upper mounting plate and mounted with their respective axes substantially parallel to the optical axis, and connection elements for transmission of movement from the axes of the solenoids to the movable shutter element, in such a way that when the solenoids are electrically activated said movable shutter element is moved towards the tubular member to be used until they couple together, and comprising additionally springs provided for automatically uncoupling the movable shutter element when the solenoids are deactivated or in case of a fault in a power supply.

13. The system according to claim 12, wherein said connection elements are pins.

14. The system according to claim 11, wherein the actuation mechanism of the movable shutter element comprise a set of solenoids coupled to the upper mounting plate and mounted with their respective axes substantially perpendicular to the optical axis, and connection elements for transmission of movement from the axes of the solenoids to the movable shutter element, in such a way that when the solenoids are electrically activated said movable shutter element is moved towards the tubular member to be used until they couple together, and comprising additionally springs provided for automatically uncoupling the movable shutter element when the solenoids are deactivated or in the case of a fault in a power supply.

15. The system according to claim 14, wherein said connection elements are pairs of wedge-shaped cams slidable with each other.

16. The system according to claim 8, wherein the upper mounting plate further comprises means for connection to a universal coupling device for image capture apparatus.

17. The system according to claim 1, further comprising an automatic focus correction mechanism for correcting the focus of each eyepiece allowing at all times an optimum focus to be provided and to send an actuation order to a motor for controlling a primary focus of the telescope.

18. The system according to claim 17, wherein said automatic focus correction mechanism comprises an electronic focus compensation unit made to capture individualised data on the focus of each eyepiece, said electronic focus compensation unit including a processor and a memory storing instructions that when executed by the processor cause the processor to process said individualised captured data to calibrate the optimum focus at all times for each eyepiece, and to send an actuation order to a primary focus control motor of the telescope in order to carry out said calibration.

19. A telescope made to view distant objects comprising a universal electronic exchange system for eyepieces, the universal electronic exchange system comprising:
an upper mounting plate;
a shutter element coupled to the upper mounting plate;
an automated rotary device comprising:
a base support provided with an opening alignable with an optical axis of a telescope;
a revolver-type rotary plate coupled on the base support;
a first tubular member comprising:
a first eyepiece; and
a first eyepiece holder connected at least indirectly to the first eyepiece;
a second tubular member comprising:
a second eyepiece; and
a second eyepiece holder connected at least indirectly to the second eyepiece;
wherein the first and second tubular members are parallel to the optical axis and adaptable to achieve appropriate height to make physical contact with the shutter element so as to prevent entrance of ambient light into an interface formed thereby an electric motor connected to the revolver-type rotary plate for transmission of a rotary movement to the revolver-type rotary plate; and an electronic unit for tubular-member selection, wherein the electronic unit is made and arranged to:

receive a selection signal indicative of a tubular member to be used, wherein the tubular member to be used is selected from the first and second tubular members, wherein the selection signal is used for controlling rotation and stopping of the revolver-type rotary plate;

process a speed, angular path of rotation and stopping position of the tubular member to be used; and send a command signal to the electric motor of the revolver-type rotary plate for positioning and aligning the tubular member to be used with the optical axis.

* * * * *